United States Patent
Turgeon

(10) Patent No.: US 10,495,288 B2
(45) Date of Patent: Dec. 3, 2019

(54) HARD STOP APPARATUS FOR AIMABLE DEVICES

(71) Applicant: Bell Helicopter Textron Inc., Fort Worth, TX (US)

(72) Inventor: Francis Turgeon, Quebec (CA)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 13 days.

(21) Appl. No.: 15/951,274

(22) Filed: Apr. 12, 2018

(65) Prior Publication Data

US 2018/0299103 A1   Oct. 18, 2018

Related U.S. Application Data

(60) Provisional application No. 62/485,204, filed on Apr. 13, 2017.

(51) Int. Cl.
*F21V 14/02* (2006.01)
*F21S 8/00* (2006.01)
*B64D 47/02* (2006.01)

(52) U.S. Cl.
CPC .............. *F21V 14/02* (2013.01); *B64D 47/02* (2013.01); *F21S 8/003* (2013.01)

(58) Field of Classification Search
CPC ........... F21V 14/02; B64D 47/02; F21S 8/003
See application file for complete search history.

(56) References Cited

U.S. PATENT DOCUMENTS

2013/0048792 A1 * 2/2013 Szarek ................ B64C 39/024
244/175

OTHER PUBLICATIONS

Canadian Intellectual Property Office, Examination Report for Canadian Appl. No. 3,001,567 dated Mar. 27, 2019, 4 pp.

* cited by examiner

*Primary Examiner* — Joseph L Williams
(74) *Attorney, Agent, or Firm* — Daniel J. Chalker; Edwin F. Flores; Chalker Flores, LLP

(57) ABSTRACT

The present invention includes a first frame attached to an aerial vehicle or a mounting plate attached to the aerial vehicle, and a second frame attached to an aimable device moveably connected to the aerial vehicle or the mounting plate. The first frame and the second frame are configured to collectively provide a hard stop that prevents the aimable device from pointing at the aerial vehicle.

25 Claims, 12 Drawing Sheets

HARD STOP APPARATUS FOR AIMABLE DEVICES

CROSS-REFERENCE TO RELATED APPLICATIONS

This patent application claims priority to U.S. provisional patent application Ser. No. 62/485,204 filed on Apr. 13, 2017 entitled "Hard Stop Apparatus for Aimable Devices," all of which is hereby incorporated by reference in its entirety.

TECHNICAL FIELD OF THE INVENTION

The present invention relates in general to the field of aerial vehicle design, and more particularly, to a hard stop apparatus for aimable devices.

STATEMENT OF FEDERALLY FUNDED RESEARCH

Not applicable.

BACKGROUND OF THE INVENTION

Without limiting the scope of the invention, its background is described in connection with aerial vehicles and aimable devices. Aircraft mounted searchlights have become increasingly more powerful over the years. These powerful searchlights generate a lot of heat that can damage the aerial vehicle. For example, FIGS. 1A and 1B depict a helicopter 100 having an aimable device 102, such as a searchlight, mounted on the boom 104. The aimable device 102 can point at and subsequently damage the skids 106, supports 108, lower portion 110 of the helicopter 100 or any other equipment attached to the helicopter 100 depending on the duration of exposure and proximity of the parts to the light beam 112. Moreover, other aimable devices, such as lasers or weapons, can also damage the aerial vehicle. The aerial vehicle can also impair the operation of some aimable devices, such as sensors.

SUMMARY OF THE INVENTION

In one embodiment, the present invention includes a first frame attached to an aerial vehicle or a mounting plate attached to the aerial vehicle, and a second frame attached to an aimable device moveably connected to the aerial vehicle or the mounting plate. The first frame and the second frame are configured to collectively provide a hard stop that prevents the aimable device from pointing at the aerial vehicle.

In another embodiment, the present invention includes a first frame attached to an aerial vehicle or a mounting plate attached to the aerial vehicle, wherein the first frame comprises a first member aligned with a forward portion of the aerial vehicle, and extending downward from the aerial vehicle or the mounting plate, and a second member aligned with a rear portion of the aerial vehicle, and extending downward from the aerial vehicle or the mounting plate; a second frame attached to an aimable device moveably connected to the aerial vehicle or the mounting plate, wherein the second frame comprises one or more mounting brackets attached to a front portion of the aimable device and a horizontal member attached to the one or more mounting brackets; and wherein the first frame and the second frame are configured to collectively provide a hard stop that prevents the aimable device from pointing at the aerial vehicle. In another aspect, the first frame and second frame are further configured to collectively provide the hard stop that prevents the aimable device from pointing at or interfering with other devices mounted on the aerial vehicle. In another aspect, the second frame prevents the aimable device from being damaged when contact is made with the first frame or the mounting plate.

In another embodiment, the present invention provides a first frame attached to an aerial vehicle or a mounting plate attached to the aerial vehicle, and a second frame attached to an aimable device moveably connected to the aerial vehicle or the mounting plate. The aimable device is moved and prevented from pointing at the aerial vehicle, or pointing at or interfering with other devices mounted on the aerial vehicle whenever the first frame contacts the second frame. In another aspect, one or more forbidden zones are created within an operational zone of the aimable device by configuring a shape of the first frame and the second frame. In another aspect, a location of the aimable device on the aerial vehicle is determined, one or more forbidden zones for the aimable device are determined based on one or more operational characteristics of the aimable device and the location of the aimable device with respect to the aerial vehicle, and a shape of the first frame and the second frame are configured to create the one or more forbidden zones within an operation zone of the aimable device.

BRIEF DESCRIPTION OF THE DRAWINGS

The novel features believed characteristic of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

DETAILED DESCRIPTION OF THE INVENTION

Figure 1A:
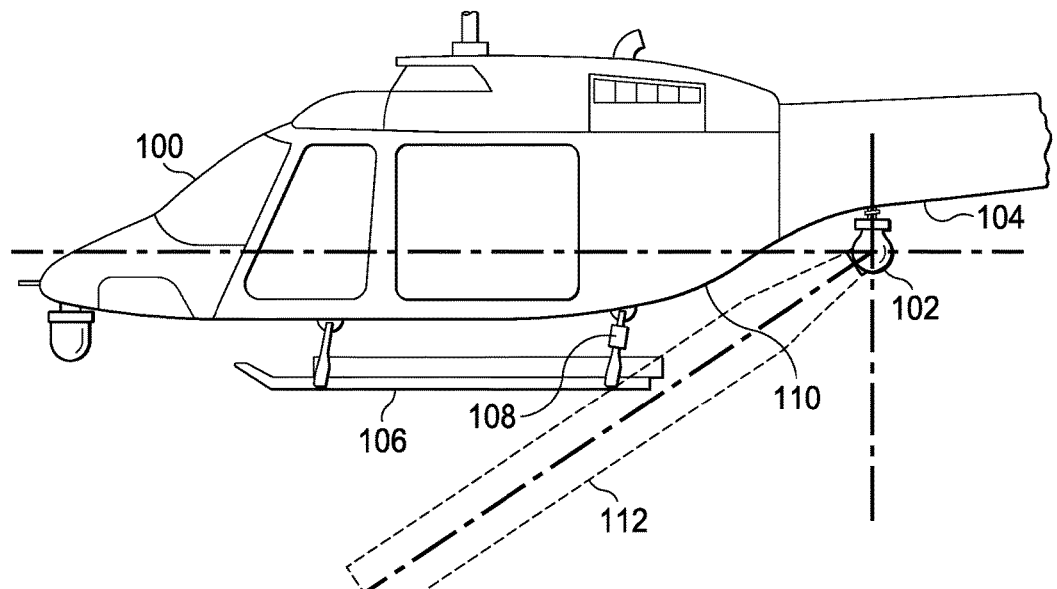
FIGS. 1A and 1B shows a side view and a close up perspective view of a helicopter equipped with an aimable device mounted on the boom according to the prior art.
Figure 1B:
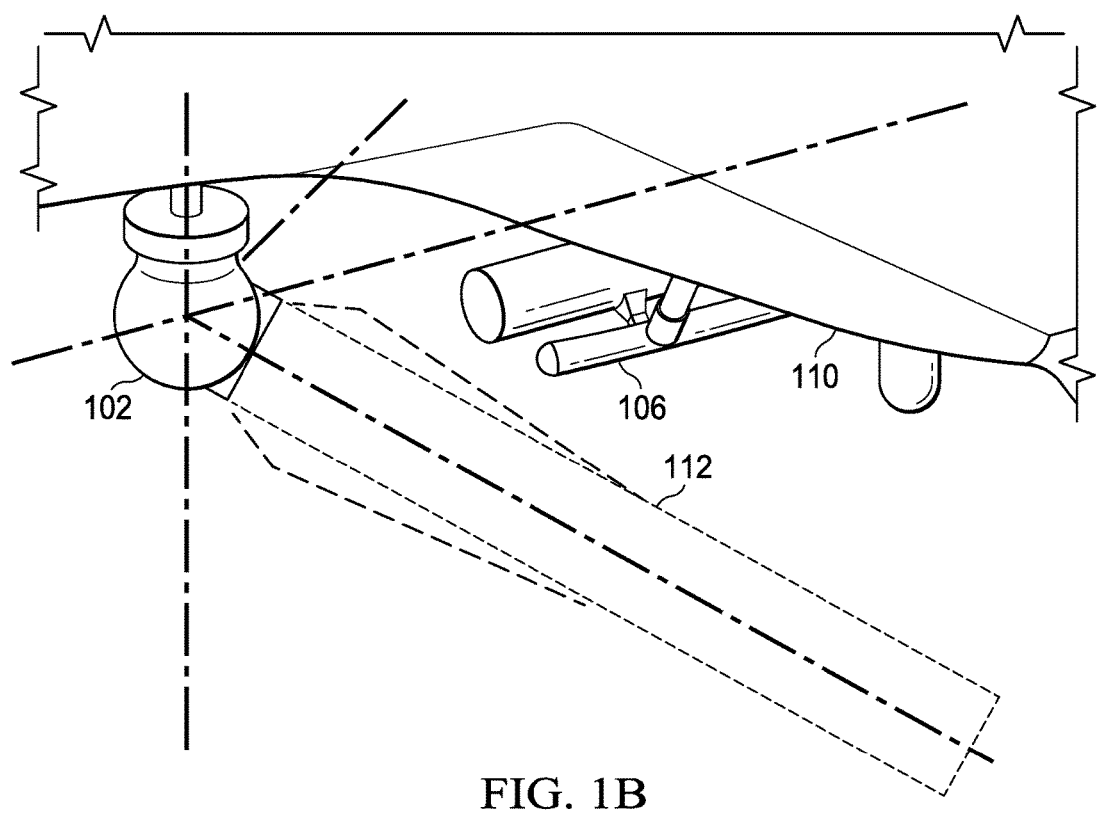

While the system of the present application is susceptible to various modifications and alternative forms, specific embodiments thereof have been shown by way of example in the drawings and are herein described in detail. It should be understood, however, that the description herein of specific embodiments is not intended to limit the present application to the particular forms disclosed, but on the contrary, the intention is to cover all modifications, equivalents, and alternatives falling within the spirit and scope of the present application as defined by the appended claims.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

Illustrative embodiments of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

As will be described in more detail below, one embodiment of the present invention includes a first frame attached to an aerial vehicle or a mounting plate attached to the aerial vehicle, and a second frame attached to an aimable device moveably connected to the aerial vehicle or the mounting plate. The first frame and the second frame are configured to collectively provide a hard stop that prevents the aimable device from pointing at the aerial vehicle. Note that the present invention is not limited to the specific embodiments shown and described herein. For example, the aerial vehicle can be a rotorcraft, a helicopter, an airplane, an unmanned aerial vehicle, a drone, a spacecraft or any other type of vehicle. The aimable device can be mounted proximate to a boom, a fuselage, a wing or other portion of the aerial vehicle. Likewise, the aimable device can be a searchlight, a laser, one or more sensors, a weapon or any other type of aimable device. As a result, the exact configuration of the frames can vary to adapt the apparatus to the specifications of any given aerial vehicle and aimable device.

Figure 2A:
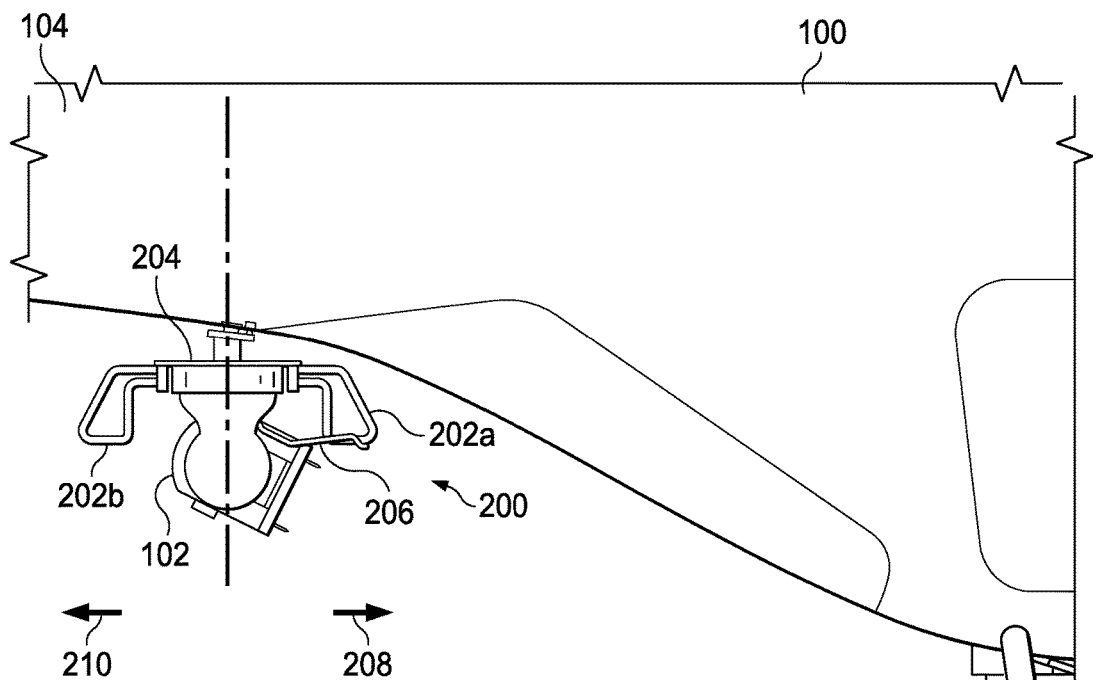
FIG. 2A shows a side view of an aimable device mounted on a boom of a helicopter with a hard stop apparatus according to one embodiment of the present invention.
Figure 2B:
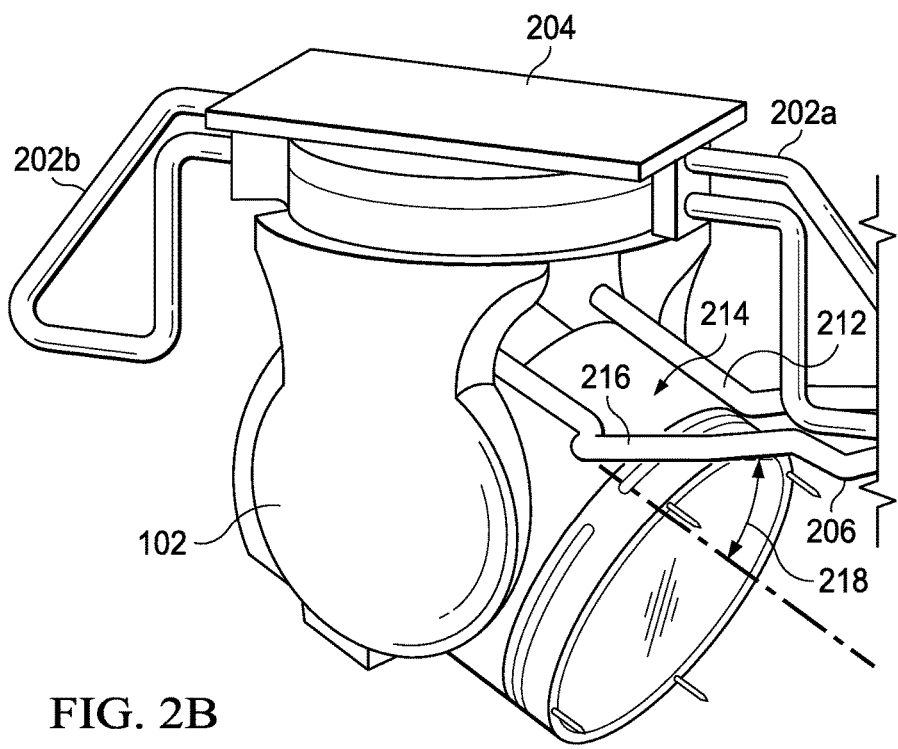
FIG. 2B shows a perspective view of the hard stop apparatus with the aimable device pointed in a forward direction according to one embodiment of the present invention.
Figure 2C:
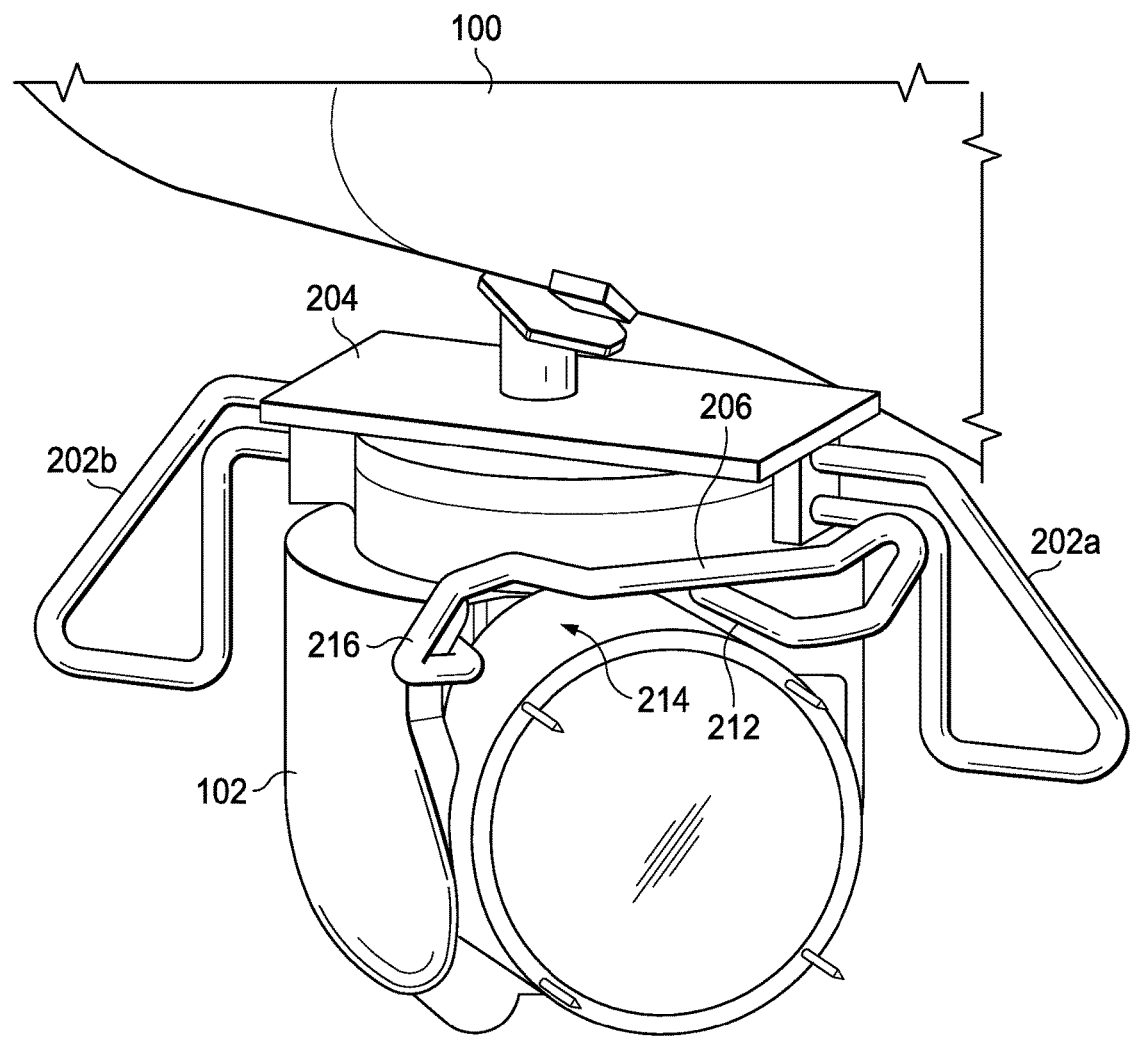
FIG. 2C shows a perspective view of the hard stop apparatus with the aimable device pointed at an angle according to one embodiment of the present invention.

FIGS. 2A-2C show various views of an aimable device 102 mounted on a boom 104 of a helicopter 100 with a hard stop apparatus 200 according to one embodiment of the present invention. The hard stop apparatus 200 includes a first frame 202 attached to an aerial vehicle 100 or a mounting plate 204 attached to the aerial vehicle 100, and a second frame 206 attached to the aimable device 102 moveably connected to the aerial vehicle 100 or the mounting plate 204. As shown, the first frame 202 includes a first elongated loop 202a aligned with a forward direction 208 of the aerial vehicle 100, and a second elongated loop 202b aligned with a rear portion 210 of the aerial vehicle 100. The first elongated loop 202a extends outward and downward from the aerial vehicle 100 or the mounting plate 204. The second elongated loop 202b extends outward and downward from the aerial vehicle 100 or the mounting plate 204. Note that is some embodiments do not include the second elongated loop 202b. The second frame 206 includes a third elongated loop having a first portion 212 extending along an upper portion 214 of the aimable device 102 and a second portion 216 that extends outward and upward from the aimable device 102 at an angle 218. The first frame 202 and the second frame 206 are configured to collectively provide a hard stop that prevents the aimable device 102 from pointing at the aerial vehicle 100. The hard stop apparatus 200 can be configured to provide one or more of the following non-limiting features/benefits: light weight, simple, minimizes drag during flight, does not risk overheating of a searchlight, does not cast a shadow on a light beam from a searchlight, is not heated by a light beam from a searchlight, provides a visual guide to record soft stops for a controller, and/or can be used for different models of searchlights.

As shown, the first frame 202 and second frame 206 are made out of a tubular material. But, the cross-section of the first frame 202 and second frame 206 can be any shape. In addition, the first frame 202 and second frame 206 can be adjustable or removable. Moreover, the materials used to fabricate the first frame 202 and second frame 206 can be any material that satisfies the load, strength, durability, aerodynamic and manufacturing specifications for the aerial vehicle and aimable device. As previously described, the aerial vehicle can be a rotorcraft, a helicopter, an airplane, an unmanned aerial vehicle, a drone, a spacecraft or any other type of vehicle. The aimable device can be mounted proximate to a boom, a fuselage, a wing or other portion of the aerial vehicle. Likewise, the aimable device can be a searchlight, a laser, one or more sensors, a weapon or any other type of aimable device.

As shown, the first frame 202 does not extend to the sides so that a maximum elevation of the aimable device 102 is +10 to −110 degrees when pointed to a side of the boom 104. In other embodiments, the first frame 202 may extend to the side(s) or provide a 360 degree track around the aimable device 102.

In some embodiments, the first frame 202 and second frame 206 are further configured to collectively provide the hard stop that prevents the aimable device 102 from pointing or interfering with other devices mounted on the aerial vehicle 100. The first frame 202 and the second frame 206 can also be configured to be outside of a line of sight of the aimable device 102. In other words, the aerial vehicle 100 does not create a shadow on the light beam. The second frame 206 also prevents the aimable device 102 from being damaged when contact is made with the first frame 202 or the mounting plate 204.

In other embodiments, a controller communicably coupled to the aimable device 102, wherein the controller is programmed to prevent the aimable device 102 from pointing at the aerial vehicle 100. These soft stops can further be programmed to stop movement of the aimable device 102 before the second frame 206 contacts the first frame 202.

Figure 3A:
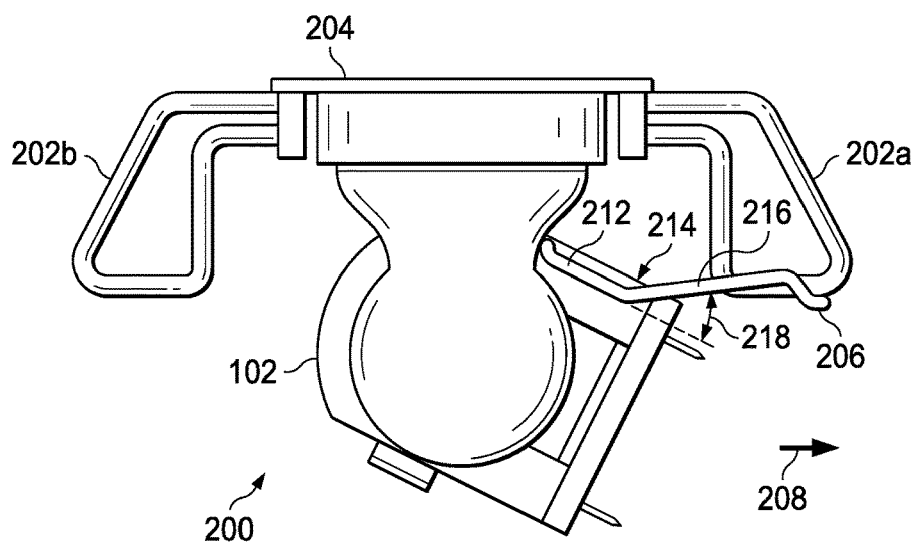
FIGS. 3A-3C show side, bottom and top views of the hard stop apparatus with the aimable device pointed in a forward direction according to one embodiment of the present invention.
Figure 3B:
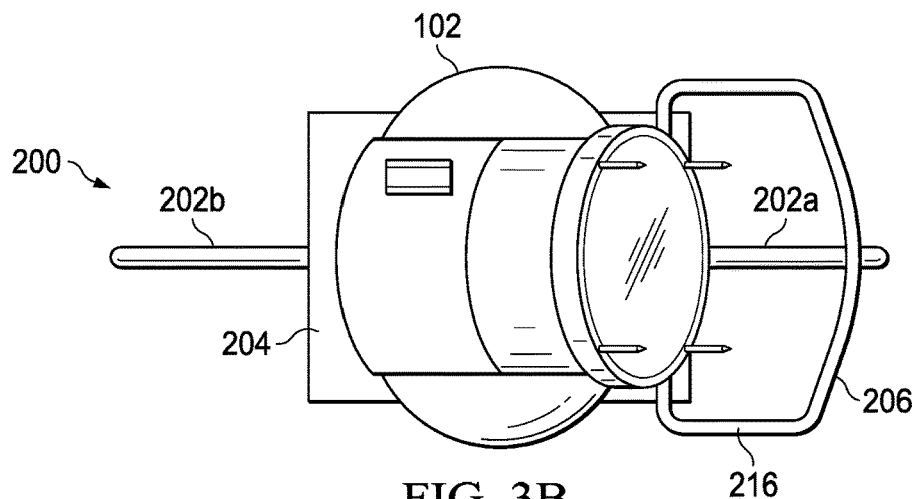
Figure 3C:
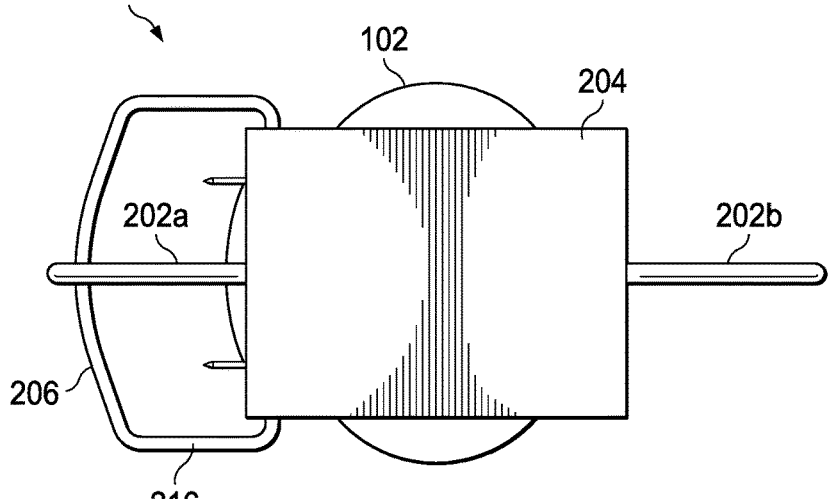

FIGS. 3A-3C show side, bottom and top views of the hard stop apparatus 200 with the aimable device 102 pointed in a forward direction 208 according to one embodiment of the present invention.

Figure 4A:
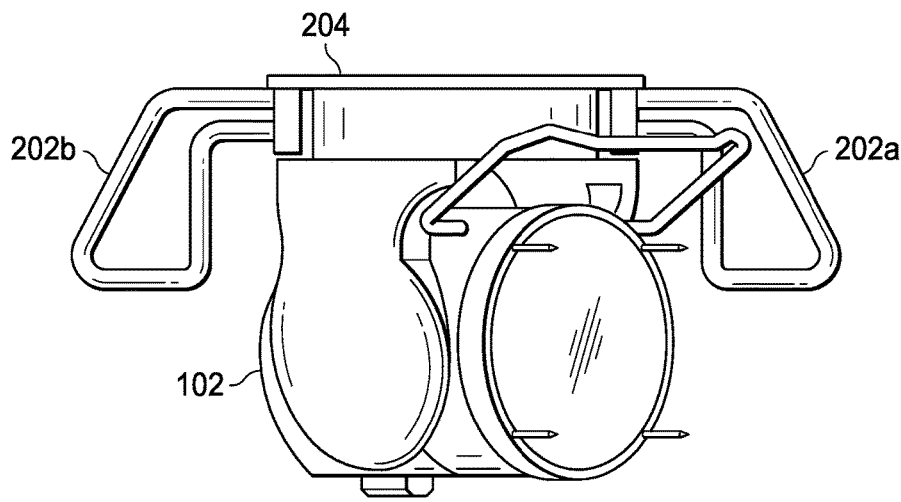
FIGS. 4A-4C show side, bottom and top views of the hard stop apparatus with the aimable device pointed at an angle according to one embodiment of the present invention.
Figure 4B:
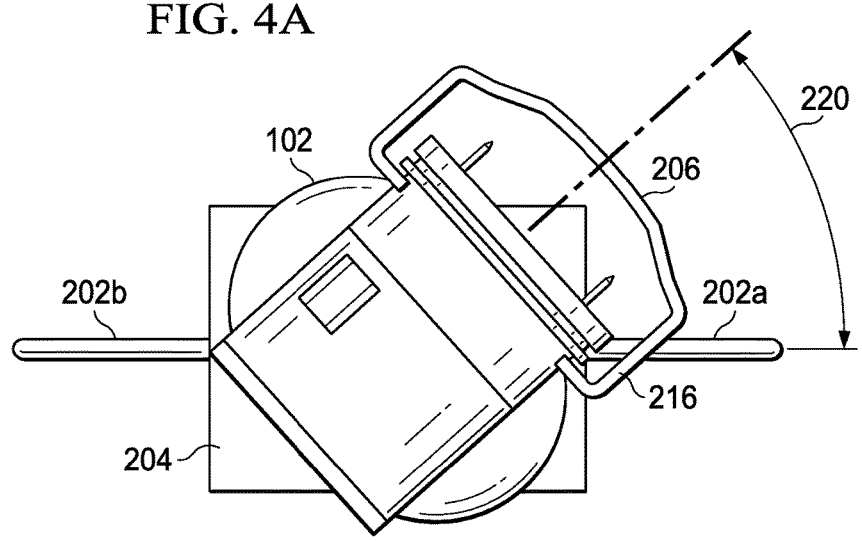
Figure 4C:
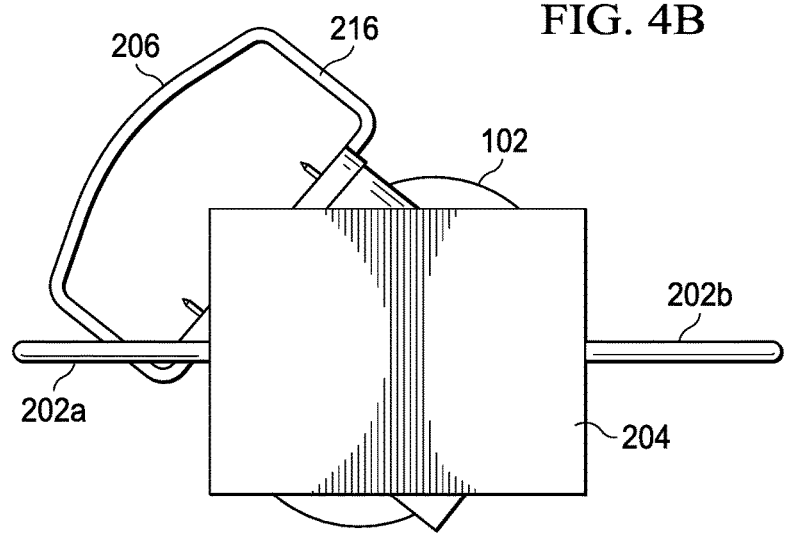

FIGS. 4A-4C show side, bottom and top views of the hard stop apparatus 200 with the aimable device 102 pointed at an angle 220 according to one embodiment of the present invention.

Figure 5A:
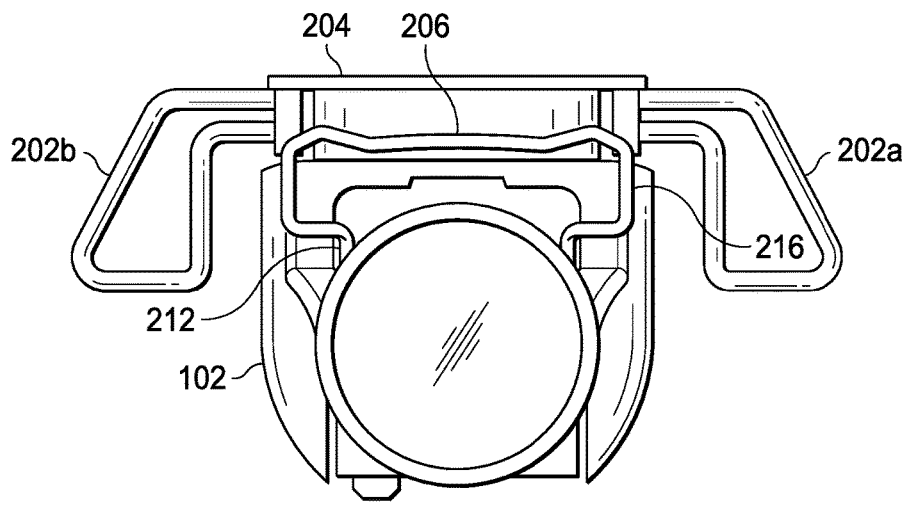
FIGS. 5A-5C show side, bottom and top views of the hard stop apparatus with the aimable device pointed to a side according to one embodiment of the present invention.
Figure 5B:
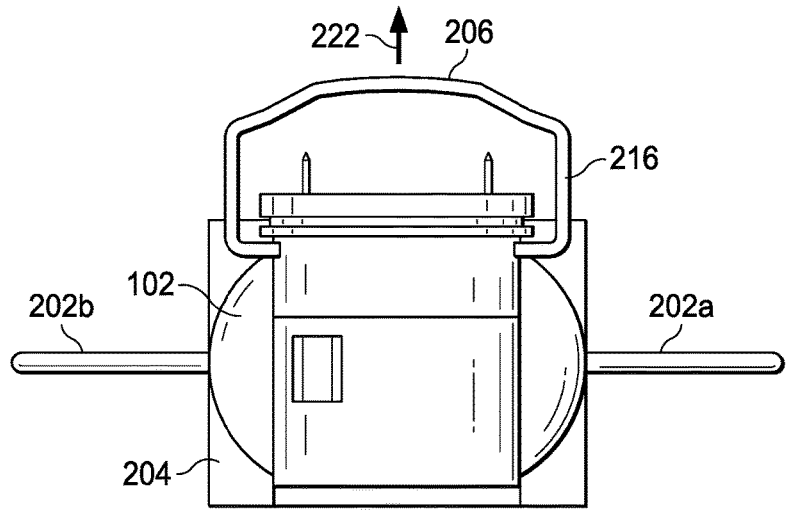
Figure 5C:
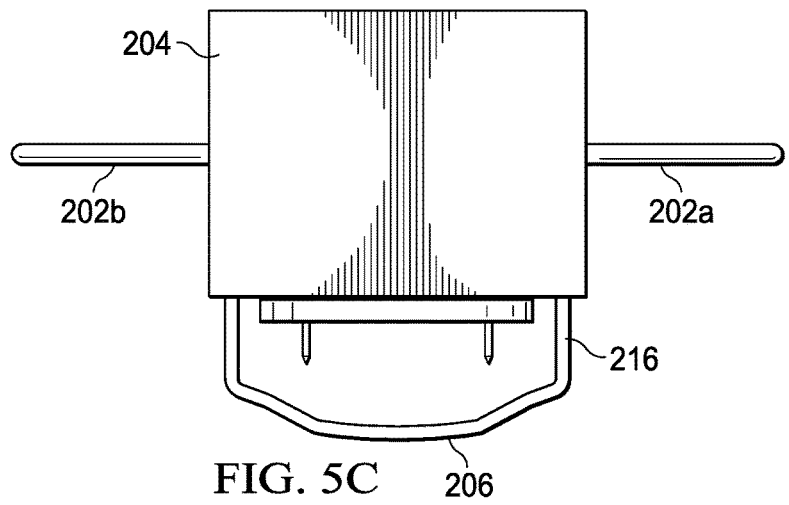

FIGS. 5A-5C show side, bottom and top views of the hard stop apparatus 200 with the aimable device 102 pointed to a side 222 according to one embodiment of the present invention.

Figure 6A:
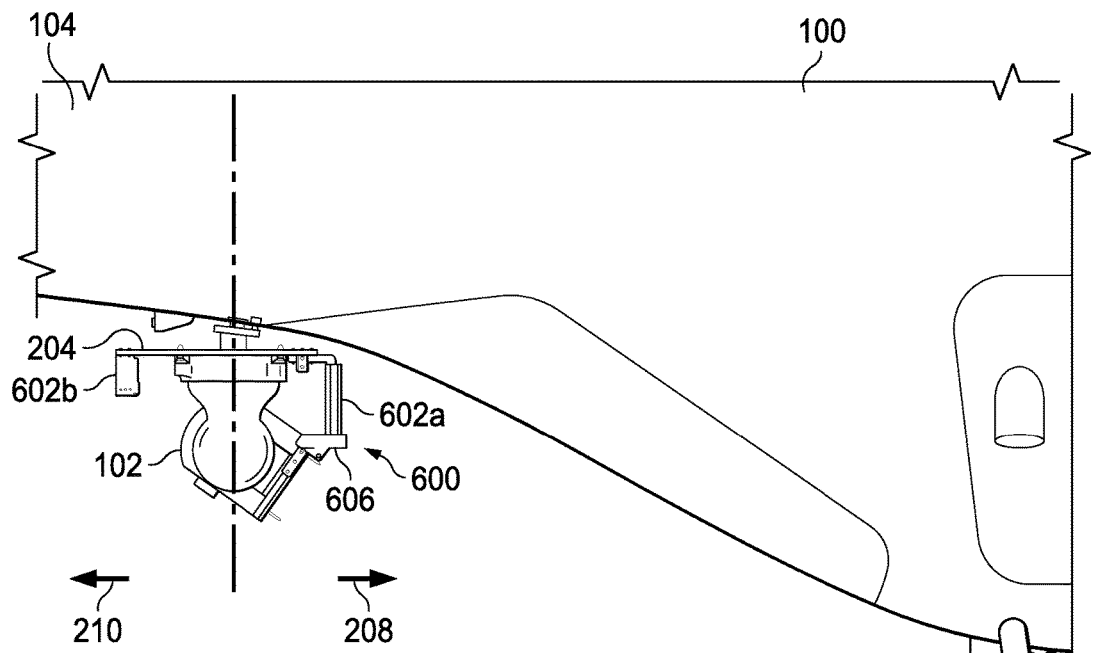
FIG. 6A shows a side view of an aimable device mounted on a boom of a helicopter with a hard stop apparatus according to another embodiment of the present invention.
Figure 6B:
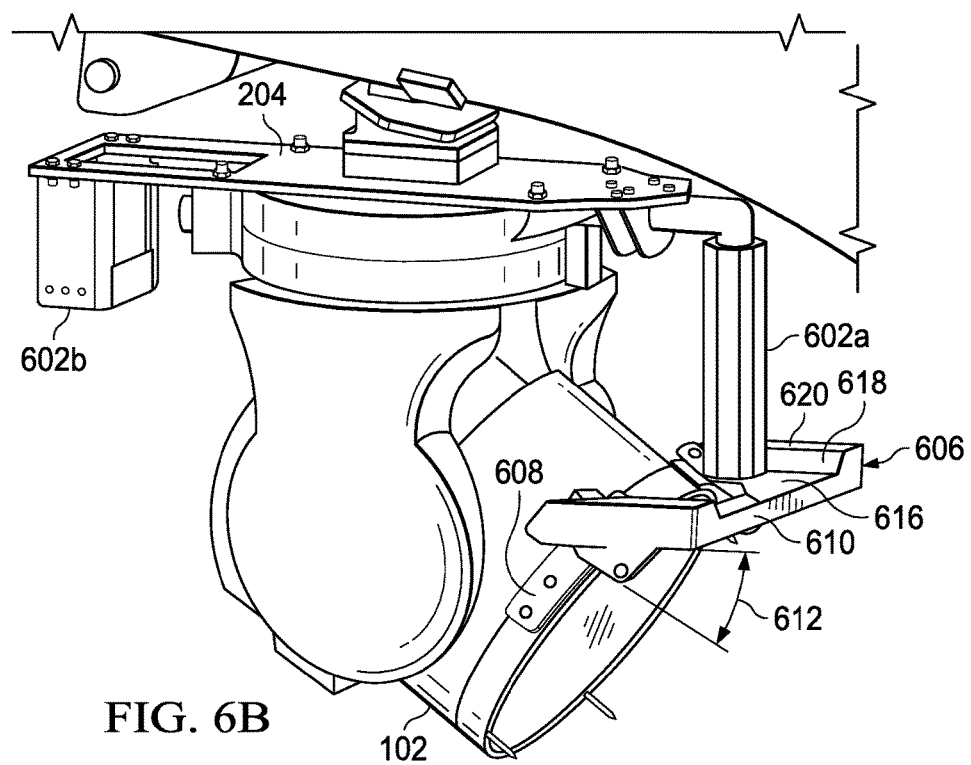
FIG. 6B shows a perspective view of the hard stop apparatus with the aimable device pointed in a forward direction according to another embodiment of the present invention.
Figure 6C:
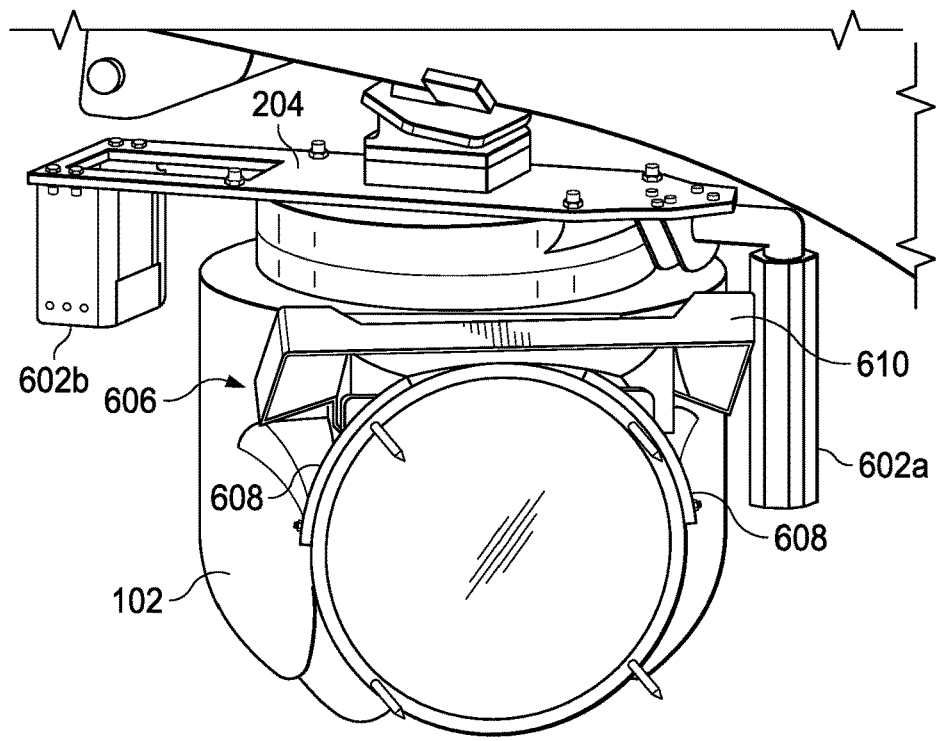
FIG. 6C shows a perspective view of the hard stop apparatus with the aimable device pointed at an angle according to another embodiment of the present invention.

FIGS. 6A-6C show various views of an aimable device 102 mounted on a boom 104 of a helicopter 100 with a hard stop apparatus 600 according to another embodiment of the present invention. The hard stop apparatus 600 includes a first frame 602 attached to an aerial vehicle 100 or a mounting plate 204 attached to the aerial vehicle 100, and a second frame 606 attached to the aimable device 102 moveably connected to the aerial vehicle 100 or the mounting plate 204. As shown, the first frame 602 includes a first member 602a and as second member 602b. The first member 602a is aligned with a forward portion of the aerial vehicle 100, and extends downward from the aerial vehicle 100 or the mounting plate 204. The second member 602b is aligned with a rear portion of the aerial vehicle 100, and extends downward from the aerial vehicle 100 or the mounting plate 204. Note that is some embodiments do not include the second member 602b. The first member 602a or the second member 602b can have a circular, square, rectangular or hexagonal shaped cross-section. Moreover, the first member 602a or the second member 602b can be straight, angled, L-shaped or curved. The second member 602b can also be a square or rectangular shaped frame. The second frame 606 includes one or more mounting brackets 608 attached to a front portion of the aimable device 102, and a third member 610 attached to the one or more mounting brackets 608 that extend outward and upward from the aimable device 102 at an angle 612. In this non-limiting example, the third member 610 has a curved end 614 proximate to the aimable device 102, and the third member 610 has a top surface comprising a flat middle portion 616, an upwardly sloping portion 618 adjacent to each end the flat middle portion 616, and a flat end portion 620 adjacent to each upwardly sloping portion 618.

The first frame 602 and the second frame 606 are configured to collectively provide a hard stop that prevents the aimable device 102 from pointing at the aerial vehicle 100. The hard stop apparatus 600 can be configured to provide one or more of the following non-limiting features/benefits: light weight, simple, minimizes drag during flight, does not risk overheating of a searchlight, does not cast a shadow on a light beam from a searchlight, is not heated by a light beam from a searchlight, provides a visual guide to record soft stops for a controller, and/or can be used for different models of searchlights.

As shown, the first member 602a is made out of a tubular material, and the second member 602b is a rectangular frame. But, the cross-section of the first member 602a, second member 602b and third member 610 can be any shape. In addition, the first frame 602 and second frame 606 can be adjustable or removable. Moreover, the materials used to fabricate the first frame 602 and second frame 606 can be any material that satisfies the load, strength, durability, aerodynamic and manufacturing specifications for the aerial vehicle and aimable device. As previously described, the aerial vehicle can be a rotorcraft, a helicopter, an airplane, an unmanned aerial vehicle, a drone, a spacecraft or any other type of vehicle. The aimable device can be mounted proximate to a boom, a fuselage, a wing or other portion of the aerial vehicle. Likewise, the aimable device can be a searchlight, a laser, one or more sensors, a weapon or any other type of aimable device.

As shown, the first frame 602 does not extend to the sides so that a maximum elevation of the aimable device 102 is +10 to −110 degrees when pointed to a side of the boom 104. In other embodiments, the first frame 602 may extend to the side(s) or provide a 360 degree track around the aimable device 102.

In some embodiments, the first frame 602 and second frame 606 are further configured to collectively provide the hard stop that prevents the aimable device 102 from pointing or interfering with other devices mounted on the aerial vehicle 100. The first frame 602 and the second frame 606 can also be configured to be outside of a line of sight of the aimable device 102. In other words, the aerial vehicle 100 does not create a shadow on the light beam. The second frame 606 also prevents the aimable device 102 from being damaged when contact is made with the first frame 602 or the mounting plate 204.

In other embodiments, a controller communicably coupled to the aimable device 102, wherein the controller is programmed to prevent the aimable device 102 from pointing at the aerial vehicle 100. These soft stops can further be programmed to stop movement of the aimable device 102 before the second frame 606 contacts the first frame 602.

Figure 7A:
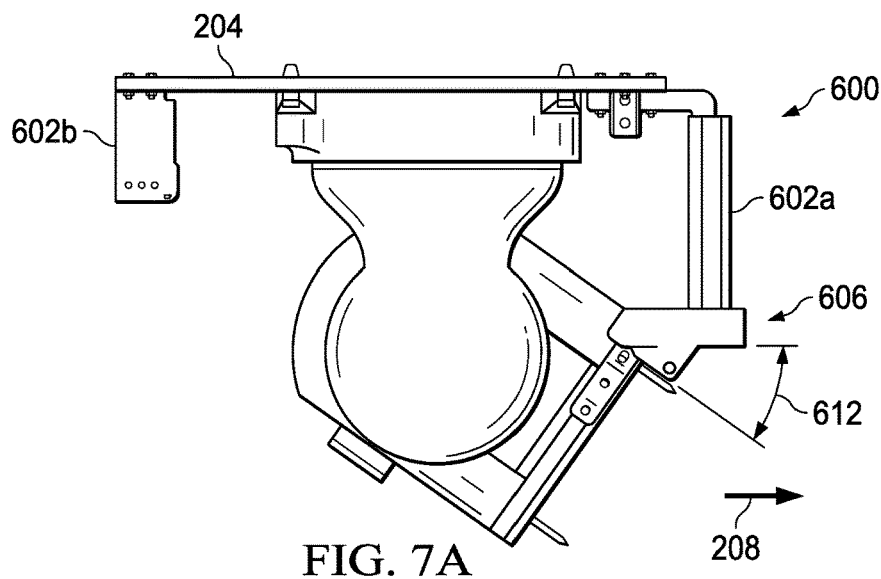
FIGS. 7A-7C show side, bottom and top views of the hard stop apparatus with the aimable device pointed in a forward direction according to another embodiment of the present invention.
Figure 7B:
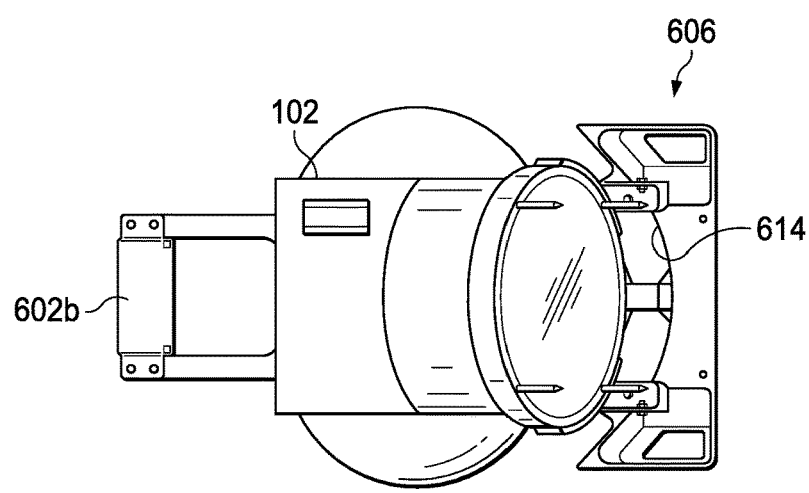
Figure 7C:
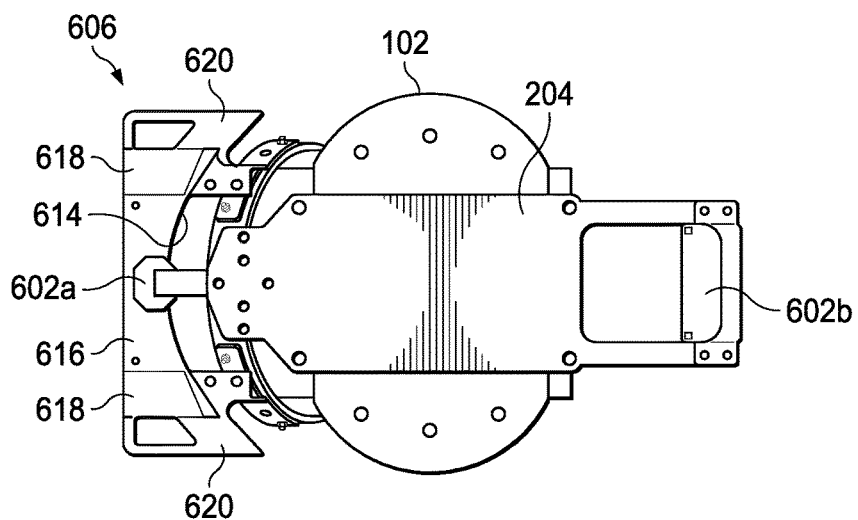

FIGS. 7A-7C show side, bottom and top views of the hard stop apparatus 600 with the aimable device 102 pointed in a forward direction 208 according to another embodiment of the present invention.

Figure 8A:
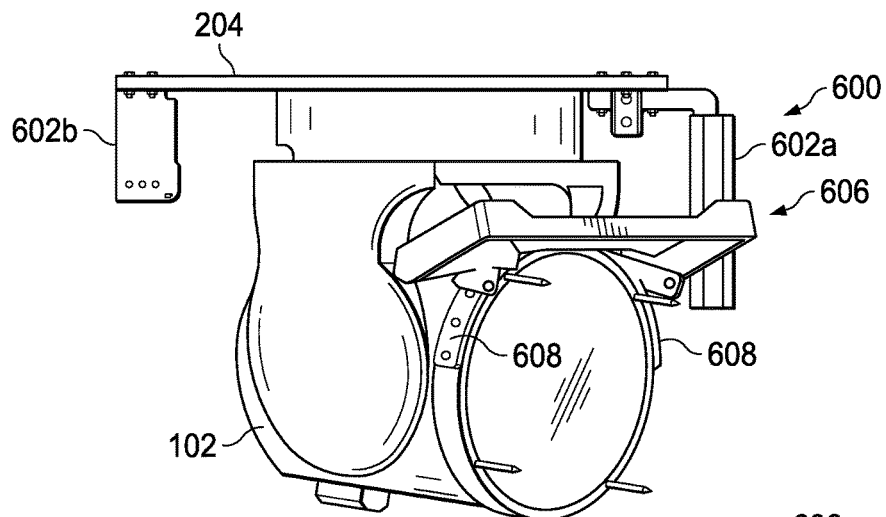
FIGS. 8A-8C show side, bottom and top views of the hard stop apparatus with the aimable device pointed at an angle according to another embodiment of the present invention.
Figure 8B:
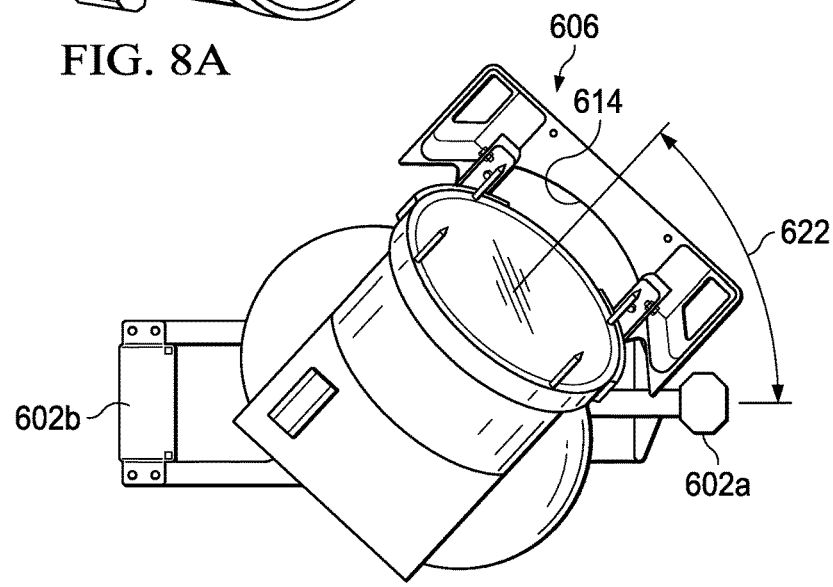
Figure 8C:
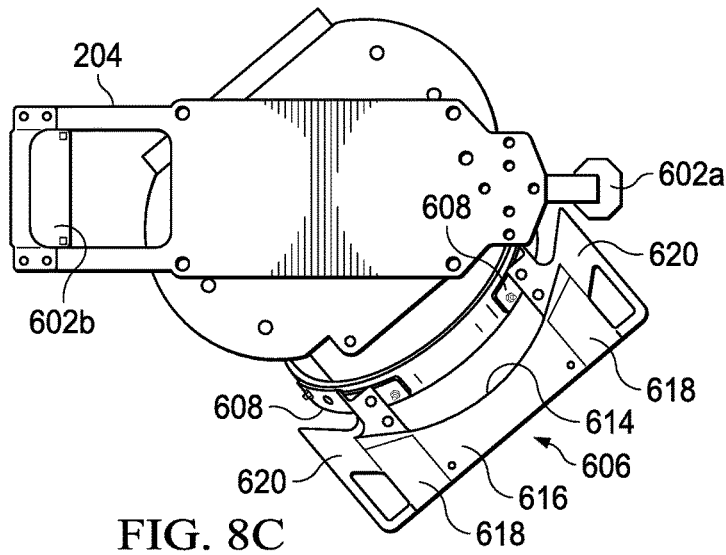

FIGS. 8A-8C show side, bottom and top views of the hard stop apparatus 600 with the aimable device 102 pointed at an angle 622 according to another embodiment of the present invention.

Figure 9A:
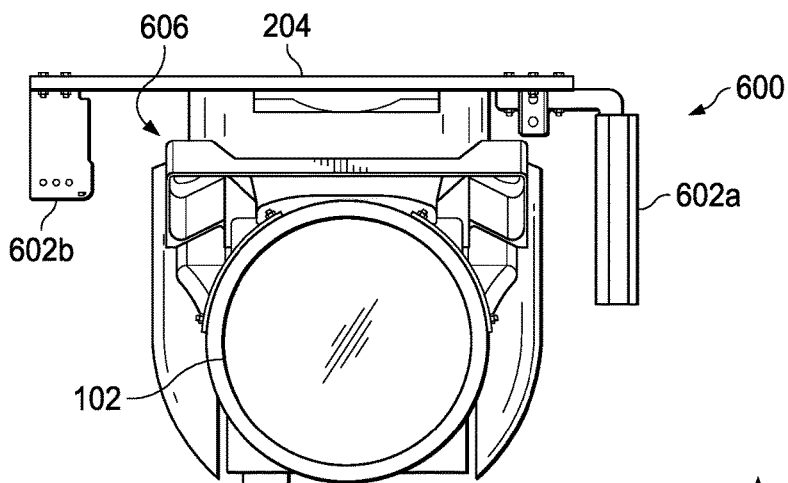
FIGS. 9A-9C show side, bottom and top views of the hard stop apparatus with the aimable device pointed to a side according to another embodiment of the present invention.
Figure 9B:
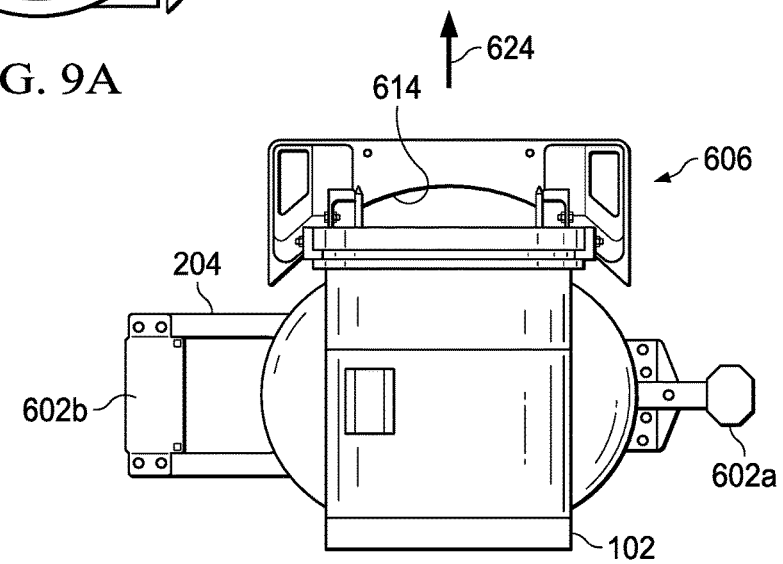
Figure 9C:
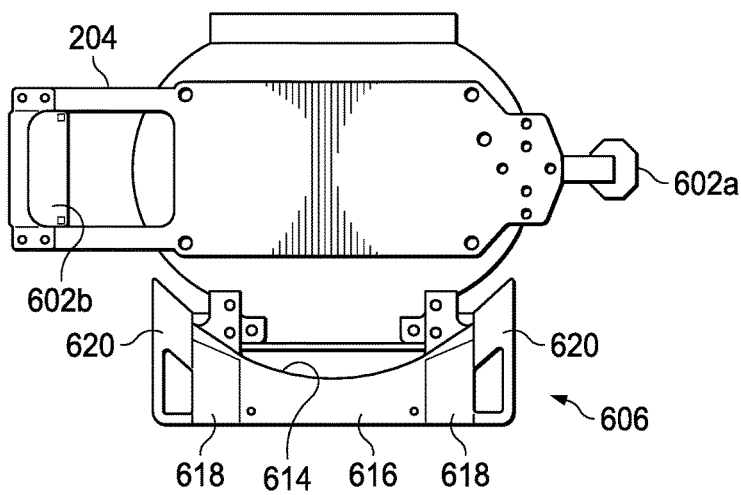

FIGS. 9A-9C show side, bottom and top views of the hard stop apparatus 600 with the aimable device 102 pointed to a side 624 according to another embodiment of the present invention.

Figure 10:
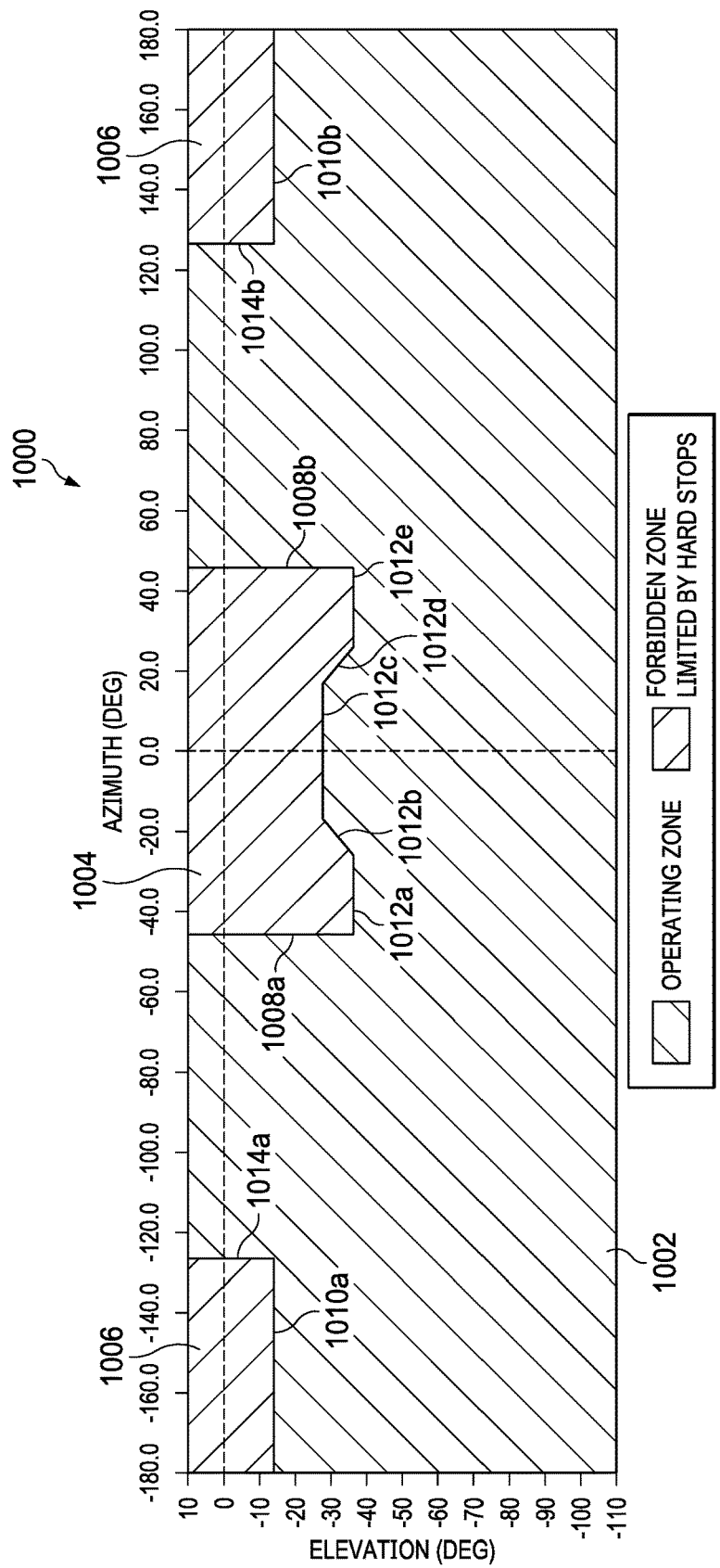
FIG. 10 shows a graph operating and forbidden zones for an aimable device according to an embodiment of the present invention.

FIG. 10 shows a graph 1000 of operating and forbidden zones for an aimable device according to an embodiment of the present invention. The graph 1000 shows the operating zone 1002 of the aimable device, a first forbidden zone 1004 (e.g., azimuth −45 degrees to +45 degrees) limited by the hard stops of the present invention corresponding to the forward portion aerial vehicle, and a second forbidden zone 1006 (e.g., azimuth −125 degrees to −180 degrees and +125 degrees to +180 degrees) limited by the hard stops of the present invention corresponding to the rear portion of the aerial vehicle. These zones will vary depending on the operational zone of the aimable device, the physical profile of the aerial vehicle and/or interference zones with other devices mounted on or in the aerial vehicle. As shown, azimuth 0 degrees corresponds to the forward portion of the aerial vehicle, and azimuth −180 and 180 degrees correspond to the rear portion of the aerial vehicle. Note that some aimable devices can rotate 360 degrees, while others may have hard stops such that they cannot rotate 360 degrees (e.g., 350 degrees: azimuth −175 degrees to +175 degrees).

The vertical length of the first frame from the mounting plate (i.e., elevation with respect to the aimable device) and the elevation of the top surface of the second frame combine to limit the aimable device to a specified elevation (lines 1010a, 1010b, and 1012a, 1012b, 1012c, 1012d, 1012e) when the two frames are in contact with one another. More specifically, lines 1010a, 1010b correspond to contact between the horizontal face of second member 602b and the horizontal face of second frame 606, and lines 1012a, 1012b, 1012c, 1012d, 1012e correspond to contact between the first member 602a and the top surface portions 620, 618, 616, 618, 620 of second frame 606 in FIGS. 6B, 7C, 8C and 9C. As shown, the top surface of the second frame can be shaped to adjust the zone 1004 (lines 1012a, 1012b, 1012c, 1012d, 1012e) to correspond to a profile of the aerial vehicle. The width or diameter of the first frame and the width of the second frame combine to limit the aimable device to a specified azimuth (lines 1008a, 1008b and 1014a, 1014b, respectively) when the two frames are in contact with one another. Note that in some embodiments, the rear first frame is not required. Moreover, the location and dimensions of the first frame will be dictated by the location of the aimable device with respect to the aerial vehicle.

Figure 11:
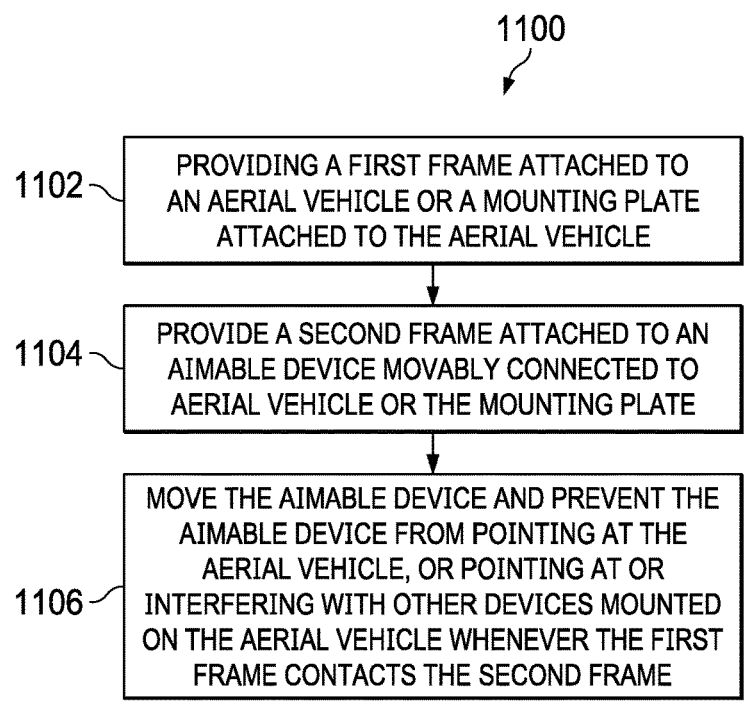
FIG. 11 shows a flow chart of a method according to an embodiment of the present invention.

FIG. 11 shows a flow chart of a method 1100 according to an embodiment of the present invention. A first frame that is attached to an aerial vehicle or a mounting plate attached to the aerial vehicle is provided in block 1102. A second frame that is attached to an aimable device moveably connected to the aerial vehicle or the mounting plate in block 1104. The aimable device is moved and prevented from pointing at the aerial vehicle, or pointing at or interfering with other devices mounted on the aerial vehicle whenever the first frame contacts the second frame in block 1106. Note that providing the frames may involve installing the frames, adjusting the frames, configuring the frames, or retrofitting an existing aimable device with the first and second frames. Moreover, the method may include creating one or more forbidden zones within an operational zone of the aimable device by configuring a shape of the first frame and the second frame. (e.g., FIG. 10). The method may also include determining a location of the aimable device on the aerial vehicle, determining one or more forbidden zones for the aimable device based on one or more operational characteristics of the aimable device and the location of the aimable device with respect to the aerial vehicle, and configuring a shape of the first frame and the second frame to create the one or more forbidden zones within an operation zone of the aimable device. Other factors may be considered. The steps of determining the forbidden zones or configuring/designing the shape of the first frame and the second frame can be implemented using software via a processor or computing device. The software can be embodied on a computer-readable medium in which the functionality of the method is executed by one or more processors.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15% from the stated value.

All of the methods disclosed and claimed herein can be made and executed without undue experimentation in light of the present disclosure. While the methods of this invention have been described in terms of preferred embodiments, it will be apparent to those of skill in the art that variations may be applied to the methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. An apparatus comprising:
   a first frame attached to an aerial vehicle or a mounting plate attached to the aerial vehicle;
   a second frame attached to an aimable device, wherein the aimable device is moveably connected to the aerial vehicle or the mounting plate; and
   wherein the first frame and the second frame are configured to collectively provide a hard stop when the second frame contacts the first frame, and the hard stop prevents the aimable device from pointing at the aerial vehicle.

2. The apparatus of claim 1, wherein the aimable device comprises a searchlight, a laser, one or more sensors, or a weapon.

3. The apparatus of claim 1, wherein the first frame and second frame are further configured to collectively provide the hard stop that prevents the aimable device from pointing at or interfering with other devices mounted on the aerial vehicle.

4. The apparatus of claim 1, wherein the first frame comprises:
   a first elongated loop aligned with a forward portion of the aerial vehicle, and extending outward and downward from the aerial vehicle or the mounting plate; and
   a second elongated loop aligned with a rear portion of the aerial vehicle, and extending outward and downward from the aerial vehicle or the mounting plate.

5. The apparatus of claim 1, wherein the second frame comprises an elongated loop having a first portion extending along an upper portion of the aimable device and a second portion that extends outward and upward from the aimable device at an angle.

6. The apparatus of claim 1, wherein the first frame or the second frame are adjustable or removable.

7. The apparatus of claim 1, wherein the first frame and the second frame are made of a tubular material.

8. The apparatus of claim 1, wherein the second frame prevents the aimable device from being damaged when contact is made with the first frame or the mounting plate.

9. The apparatus of claim 1, wherein the first frame and the second frame are configured to be outside of a line of sight of the aimable device.

10. The apparatus of claim 1, wherein the aerial vehicle is a rotorcraft, a helicopter, an airplane, an unmanned aerial vehicle, a drone, or a spacecraft.

11. The apparatus of claim 1, wherein the aimable device is mounted proximate to a boom, a fuselage or a wing.

12. The apparatus of claim 1, wherein the aimable device is mounted proximate to a boom of a rotorcraft and a maximum elevation of the aimable device is +10 to −110 degrees when pointed to a side of the boom.

13. The apparatus of claim 1, further comprising a controller communicably coupled to the aimable device, wherein the controller is programmed to prevent the aimable device from pointing at the aerial vehicle.

14. The apparatus of claim 13, wherein the controller is further programmed to stop movement of the aimable device before the second frame contacts the first frame.

15. The apparatus of claim 1, wherein the first frame comprises:
   a first member aligned with a forward portion of the aerial vehicle, and extending downward from the aerial vehicle or the mounting plate; and
   a second member aligned with a rear portion of the aerial vehicle, and extending downward from the aerial vehicle or the mounting plate.

16. The apparatus of claim 15, wherein:
   the first member or the second member have a circular, square, rectangular or hexagonal shaped cross-section; or
   the first member or the second member is straight, angled, L-shaped or curved.

17. The apparatus of claim 15, wherein the second member comprises a square or rectangular shaped frame.

18. The apparatus of claim 1, wherein the second frame comprises:
   one or more mounting brackets attached to a front portion of the aimable device; and
   a third member attached to the one or more mounting brackets that extend outward and upward from the aimable device at an angle.

19. The apparatus of claim 18, wherein:
   the third member has a curved end proximate to the aimable device; and
   the third member has a top surface comprising a flat middle portion, an upwardly sloping portion adjacent to each end the flat middle portion, and a flat end portion adjacent to each upwardly sloping portion.

20. An apparatus comprising:
   a first frame attached to an aerial vehicle or a mounting plate attached to the aerial vehicle, wherein the first frame comprises a first member aligned with a forward portion of the aerial vehicle, and extending downward from the aerial vehicle or the mounting plate, and a second member aligned with a rear portion of the aerial vehicle, and extending downward from the aerial vehicle or the mounting plate;

a second frame attached to an aimable device, wherein the aimable device is moveably connected to the aerial vehicle or the mounting plate, wherein the second frame comprises one or more mounting brackets attached to a front portion of the aimable device and a horizontal member attached to the one or more mounting brackets; and wherein the first frame and the second frame are configured to collectively provide a hard stop when the second frame contacts the first frame, and the hard stop prevents the aimable device from pointing at the aerial vehicle.

21. The apparatus of claim 20, wherein the first frame and second frame are further configured to collectively provide the hard stop that prevents the aimable device from pointing at or interfering with other devices mounted on the aerial vehicle.

22. The apparatus of claim 20, wherein the second frame prevents the aimable device from being damaged when contact is made with the first frame or the mounting plate.

23. A method comprising:
providing a first frame attached to an aerial vehicle or a mounting plate attached to the aerial vehicle;
providing a second frame attached to an aimable device, wherein the aimable device is moveably connected to the aerial vehicle or the mounting plate; and
moving the aimable device and preventing the aimable device from pointing at the aerial vehicle, or pointing at or interfering with other devices mounted on the aerial vehicle whenever the first frame contacts the second frame.

24. The method of claim 23, further comprising creating one or more forbidden zones within an operational zone of the aimable device by configuring a shape of the first frame and the second frame.

25. The method of claim 23, further comprising:
determining a location of the aimable device on the aerial vehicle;
determining one or more forbidden zones for the aimable device based on one or more operational characteristics of the aimable device and the location of the aimable device with respect to the aerial vehicle; and
configuring a shape of the first frame and the second frame to create the one or more forbidden zones within an operation zone of the aimable device.

* * * * *